United States Patent
Desbiolles et al.

(10) Patent No.: US 7,605,586 B2
(45) Date of Patent: Oct. 20, 2009

(54) DETERMINATION OF THE ABSOLUTE ANGULAR POSITION OF A STEERING WHEEL BY INCREMENTAL MEASUREMENT AND MEASURING THE DIFFERENTIAL SPEED OF THE WHEELS

(75) Inventors: Pascal Desbiolles, Thorens-Glières (FR); Christophe Duret, Quintal (FR)

(73) Assignee: S.N.R. Roulements, Annecy (FR)

( * ) Notice: Subject to any disclaimer, the term of this patent is extended or adjusted under 35 U.S.C. 154(b) by 107 days.

(21) Appl. No.: 12/003,528

(22) Filed: Dec. 28, 2007

(65) Prior Publication Data

US 2008/0177502 A1 Jul. 24, 2008

Related U.S. Application Data

(63) Continuation of application No. 10/560,106, filed as application No. PCT/FR2004/001453 on Jun. 10, 2004, now abandoned.

(30) Foreign Application Priority Data

Jun. 11, 2003 (FR) .................................. 03 07002

(51) Int. Cl.
*G01B 7/30* (2006.01)
(52) U.S. Cl. ................................. 324/207.25
(58) Field of Classification Search ............... 25/207.25
See application file for complete search history.

(56) References Cited

U.S. PATENT DOCUMENTS

| 5,001,637 | A |   | 3/1991 | Shiraishi et al. |
|---|---|---|---|---|
| 5,078,226 | A |   | 1/1992 | Inagaki et al. |
| 5,343,393 | A |   | 8/1994 | Hirano et al. |
| 5,642,281 | A |   | 6/1997 | Ishida et al. |
| 6,552,534 | B2 | * | 4/2003 | Desbiolles et al. ..... 324/207.25 |

FOREIGN PATENT DOCUMENTS

| DE | 198 56 304 A | 10/1999 |
|---|---|---|
| EP | 0 353 995 A | 2/1990 |
| EP | 0 460 582 A | 12/1991 |
| FR | 2 754 063 A | 4/1998 |
| FR | 2 792 403 A | 10/2000 |

* cited by examiner

*Primary Examiner*—Jay M Patidar
(74) *Attorney, Agent, or Firm*—Arent Fox LLP

(57) ABSTRACT

The system for determining the absolute angular position $\theta$ of a steering wheel (1) of a motor vehicle with respect to the chassis thereof comprises a device for incrementally measuring the relative angular position $\delta$ of the steering wheel, a device (2) for measuring the differential velocity $\Delta V/V$ of the wheels mounted on the same axle and a processing device (8) for sampling the angular positions and differential velocities at a period t. Said device comprises computing means suitable to determine at moments tn: the estimate $\theta^*(t_n)$ of an absolute angular position $\theta(t_n)$ according to the differential velocity $\Delta V/V$, the mean difference offset($t_n$) between the angular positions $\theta^*(t_n)$ and $\delta(t_i)$, wherein i is a variant ranging from 0 to n and the absolute angular position $\theta(t_n)$ by the addition between the mean difference offset($t_n$) and the angular position $\delta(t_n)$.

4 Claims, 1 Drawing Sheet

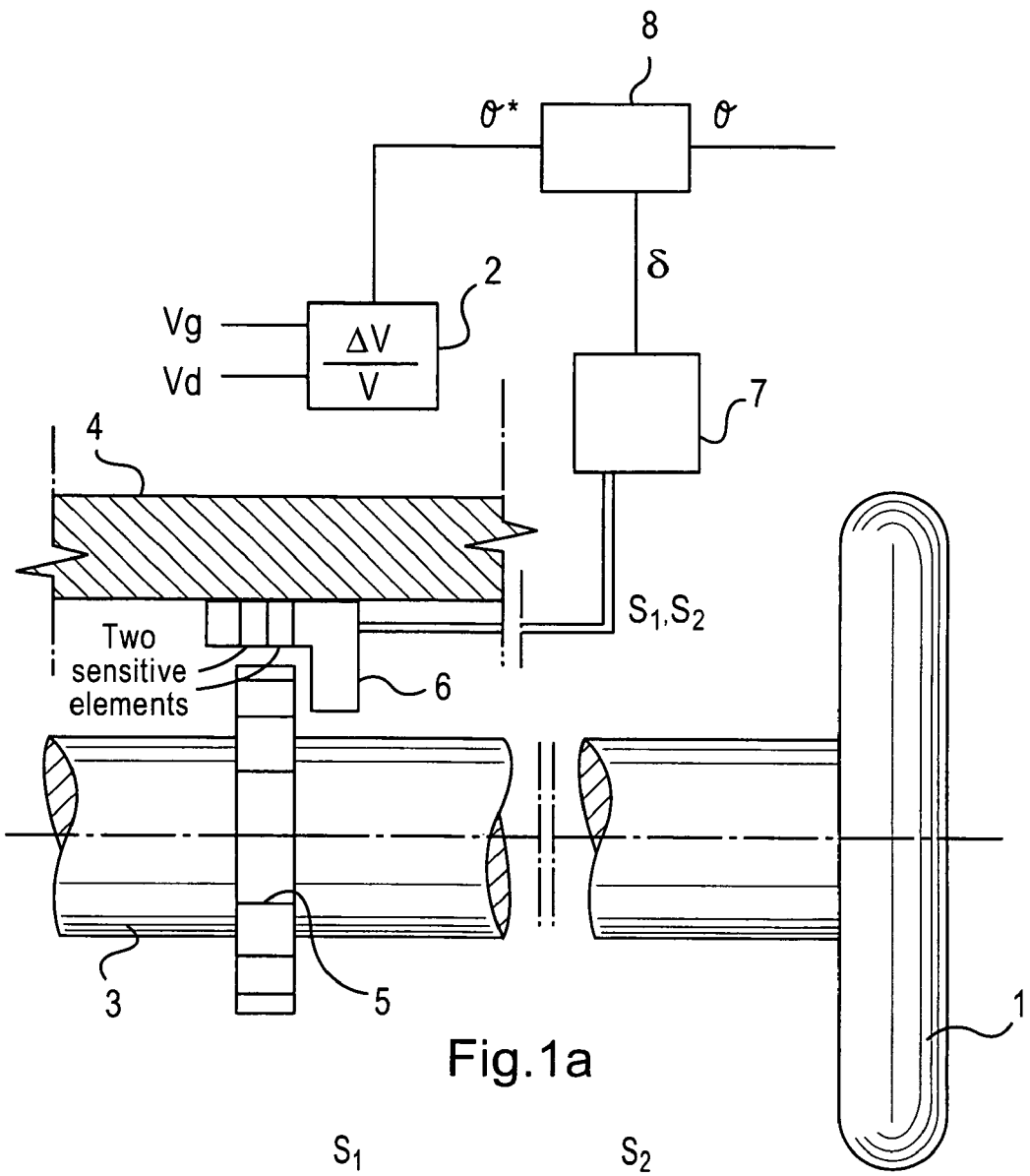
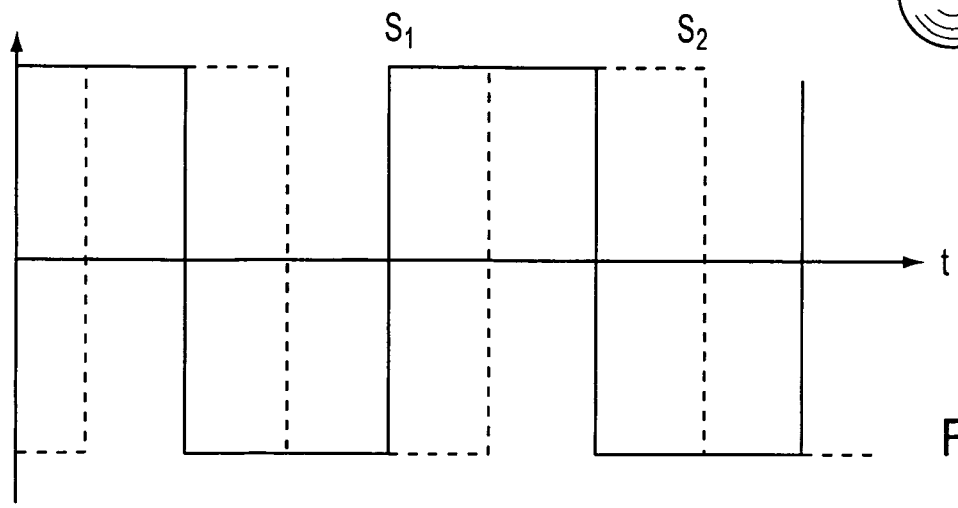
Fig.1a
Fig.1b

DETERMINATION OF THE ABSOLUTE ANGULAR POSITION OF A STEERING WHEEL BY INCREMENTAL MEASUREMENT AND MEASURING THE DIFFERENTIAL SPEED OF THE WHEELS

CROSS-REFERENCE TO RELATED APPLICATION

This application is a Continuation of U.S. patent application Ser. No. 10/560,106 filed Jun. 12, 2006 now abandoned which claims priority to International Application Number PCT/FR2004/001453, filed Jun. 10, 2004. The disclosure of the prior applications are hereby incorporated herein in their entirety by reference.

The invention relates to a method for determining the absolute angular position of the steering wheel of a motor vehicle with regard to the chassis of said vehicle, as well as to a method for using such a system.

In many applications, mainly such as integrated chassis control systems and electrical power steering systems, it is necessary to know the absolute angular position of the steering wheel with regard to the chassis.

By absolute angular position we refer to the angle that separates the position of the steering wheel, at any given time, from a reference position, this reference position being fixed and provided with regard to the chassis.

On the other hand, the relative angular position is the angle that separates the position of the steering wheel from any initial position whatsoever and is variable with regard to the chassis.

To determine the absolute angular position of the steering wheel, there is a known way of using the measurement of the differential speed of the wheels on the same axle. In fact, it is possible to establish a bijective relationship between this differential speed and the angular position since, when the vehicle is following a straight or curved trajectory, each of the wheels has a trajectory with an identical centre of curvature. One of the problems that appear is that this determination strategy only makes it possible to estimate the absolute angular position with mediocre precision, possibly as low as +/−50°, said precision also depending on the driving conditions of the vehicle.

Furthermore, there are known devices for incremental measurement of the angular position of the steering wheel that make it possible to obtain the relative angular position of the steering wheel with high levels of precision. However, to obtain the absolute angular position, it then becomes necessary to contemplate the determination of at least one reference position. Such a strategy is, for example, described in document EP-1,167,927. One limitation of these devices is that the detection of the reference angular position is only possible once per revolution, which, in certain driving conditions, may lead to the absolute angular position being determined only after a considerable amount of time and, therefore, distance traveled by the vehicle.

The invention aims to solve these problems by proposing a system for determining the absolute angular position of the steering wheel that makes it possible, around measured relative angular positions, to calculate a mobile point-to-point average of the estimates of absolute angular positions that result from measuring the differential speed of the wheels, said average being used to realign a relative angular position so as to obtain the relevant absolute angular position.

For this purpose, according to a first aspect, the invention provides a system for determining the absolute angular position $\theta$ of the steering wheel of a motor vehicle with regard to the chassis of said vehicle, said system including:
- a device for incremental measurement of the relative angular position $\delta$ of the steering wheel, including:
  - an encoder intended to be set in rotation together with the steering wheel, said encoder including a main multipolar track;
  - a fixed sensor placed with respect to and at a gap distance from the encoder, including at least two sensitive elements positioned with respect to the main track so as to deliver two periodic electrical signals S1, S2, in quadrature, the sensor including a suitable electronic circuit, so as to deliver the relative angular position $\delta$ of the steering wheel based on the signals S1, S2;
- a device for measuring the differential speed $\Delta V/V$ of the wheels on the same axle;
- a processing device that is able to sample, in a period t, the angular positions $\delta(t_i)$ and the differential speeds $\Delta V/V (t_i)$, said device including calculation means suitable, at every $t_n$ instant, for:
  - determining an estimate $\theta^*(t_n)$ of the absolute angular position $\theta(t_n)$ according to the differential speed $\Delta V/V(t_n)$;
  - determining the average offset($t_n$) difference between the angular positions $\theta^*(t_i)$ and $\delta(t_i)$, where i varies from 0 to n;
  - determining the absolute angular position $\theta(t_n)$ by adding the average offset($t_n$) difference and the angular position $\delta(t_n)$.

According to a second aspect, the invention provides a method for determining the angular position $\theta$ by means of such a system, said method including repeated steps that aim to:
- measure the angular position $\delta(t_n)$ and the differential speed $\Delta V/V(t_n)$;
- determine an estimate $\theta^*(t_n)$ of the absolute angular position $\theta(t_n)$ according to the differential speed $\Delta V/V(t_n)$;
- determine the difference in the average of the vectors $\hat{\theta}^*(t_n)=[\theta^*(t_0), \ldots, \theta^*(t_n)]$ and $\hat{\delta}(t_n)=[\delta(t_0), \ldots, \delta(t_n)]$ so as to obtain the average offset($t_n$) difference;
- determine the absolute angular position $\theta(t_n)$ by adding the average offset($t_n$) difference and the angular position $\delta(t_n)$.

Further objectives and advantages of the invention will become apparent from the following description, made in reference to the appended diagram, which is a diagrammatic, partial view of a steering system for a motor vehicle, which is equipped with a system for determining the absolute angular position of the steering wheel.

FIG. 1a illustrates in a part schematic, part structural view of an embodiment of a system according to the present invention.

FIG. 1b shows graphically the signals output by the sensor of the present invention.

The invention relates to a system for determining the absolute angular position $\theta$ of the steering wheel 1 of a motor vehicle with regard to the chassis of said vehicle. In a specific example, this position is intended to be used in integrated chassis control systems or power steering systems.

The system includes a device 2 for measuring the differential speed $\Delta V/V$ of the wheels on the same axle of the vehicle and a device for incremental measurement of the relative angular position $\delta$ of the steering wheel 1.

With regard to FIG. 1a, such a system is described mounted on a steering system including a steering column 3 with which the steering wheel 1 is associated, by means of which the driver applies a torque and thus a steering lock angle. Furthermore, the column 3 is arranged so as to transmit the steering lock angle to the turning wheels of the vehicle. For this purpose, the wheels may be mechanically linked to the column 3 by means of a rack and pinion so as to transform the rotation movement of the steering column 3 into angular displacement of the wheels, or may be decoupled from the column 3. The steering system also includes a fixed element 4, solidly attached to the chassis of the motor vehicle.

The steering wheel 1 is arranged so as to be able to make several turns, typically two, on either side of the "straight line" position in which the wheels are straight.

The incremental measurement device shown in the FIG. 1a includes an encoder 5 which is solidly attached in rotation around the column 3 and a fixed sensor 6 associated with the element 4 so that the sensitive elements of said sensor are arranged with regard to and at a gap distance from the encoder 5. The system according to the invention makes it possible to determine the absolute angular position of the encoder 5 and thus of the steering wheel 1, with regard to the fixed element 4 and thus to the chassis.

The encoder 5 includes a main multipolar track. In a particular example, the encoder 5 is formed by a magnetic multipolar ring on which multiple pairs of north and south poles are magnetised and evenly distributed with a constant angle width so as to form the main track.

Moreover, the sensor 6 includes at least two sensitive elements, for example chosen form the group including Hall-effect probes, magnetoresistances and giant magnetoresistances.

The sensor 6 used is able to deliver periodical electrical signals S1, S2 in quadrature by means of the sensitive elements as shown in FIG. 1b.

The principle for obtaining the signals S1 and S2 from a multitude of aligned sensitive elements is described, for example, in the document FR-2,792,403 issued by the applicant. But sensors 6 including two sensitive elements which are capable of delivering the signals S1 and S2 are also known.

The sensor includes, in addition, an electronic circuit 7 which delivers the squared digital position signals A, B in quadrature from the signals S1, S2, which make it possible to calculate the relative angular position 6 of the steering wheel 1. In particular, the electronic circuit 7 includes counting means that are capable of determining, from an initial position, the variations of the angular position of the encoder 5. In an example of an embodiment of the invention, the counting means include a register in which the value of the angular position is increased or reduced according to an angular value that corresponds to the number of wavefronts of the signals A and B detected, the initial value being fixed, for example, at zero on commissioning the system. Thus, the electronic circuit 7 makes it possible to determine the relative position of the encoder 5 with regard to the initial position.

According to an embodiment of the invention, the electronic circuit 7 also includes an interpolator of a type for example described in document FR-2,754,063 by the applicant, allowing the resolution of the output signal resolution to be increased. In particular, a resolution of less than 1° of the angular position δ can be obtained.

The sensor 6 with its electronic circuit 7 may be incorporated on a silicon substrate or similar, for example AsGa, so as to form an integrated circuit that is customised for a specific application, a circuit sometimes denoted under the term ASIC to refer to an integrated circuit designed entirely or partially according to its specific purpose.

Although the description is made with regard to a magnetic encoder/sensor assembly, it is also possible to implement the invention in an analogous fashion using an optical sensor. For example, the encoder 5 can be formed by a metal or a glass tracking pattern on which the main track is engraved so as to form an optical pattern that is analogous to the multipolar magnetic pattern stated above, the sensitive elements then being formed by optical detectors.

The device 2 for measuring the differential speed $\Delta V/V$ is supplied with the respective speeds of the left $V_g$ and right $V_d$ wheels on the same axle, and includes calculation means arranged to provide said differential speed.

The determination system also includes a processing device 8 that is able to sample, in a period t, the angular positions $\delta(t_i)$ and the differential speeds $\Delta V/V(t_i)$. In addition, the processing device includes calculation means suitable, at every $t_n$ instant, for:

determining an estimate $\theta^*(t_n)$ of the absolute angular position $\theta(t_n)$ according to the differential speed $\Delta V/V(t_n)$;

determining the average offset($t_n$) difference between the angular positions $\theta^*(t_i)$ and $\delta(t_i)$, where i varies from 0 to n;

determining the absolute angular position $\theta(t_n)$ by adding the average offset($t_n$) difference and the angular position $\delta(t_n)$.

The following is a description of an implementation mode of a determination system according to the invention in which the angular position $\delta(t_i)$ and the differential speed $\Delta V/V(t_i)$ are sampled, for example, over a period of 1 ms.

An estimate $\theta^*(t_i)$ of the angular position $\theta(t_i)$ is determined by means of the calculation for each measurement of the differential speed $\Delta V/V(t_i)$. Supposing that the friction between the ground and the wheels is negligible, there is a bijective relationship between the angular position $\theta^*(t_i)$ and the differential speed $\Delta V/V(t_i)$ of the wheels. This friction is particularly negligible when the measurement of the differential speed is taken on the non-drive wheels, but also on the drive wheels when there is normal adherence. According to an embodiment, the relationship is identified with the help of measurements taken on the vehicle in optimum conditions that can include:

movement of a vehicle across a flat area;

stable vehicle speed;

slow turning of the steering wheel;

nominal tyre pressure;

dry ground.

In these conditions, it is possible to establish the polynomial relationship, for example of order three, that makes it possible to estimate the angular position $\theta^*(t_i)$ according to the differential speed $\Delta V/V(t_i)$. By using this relationship inside the processing device 8 it is possible, at any time, to obtain an estimate $\theta^*(t_i)$ of the angular position $\theta(t_i)$ according to the measured differential speed $\Delta V/V(t_i)$.

The incremental angular position $\delta(t_i)$ makes it possible to know the variations in the angular position $\theta(t_i)$ over time, but is shifted by a constant offset value with regard to said absolute angular position.

The method according to the invention proposes to calculate this value by contemplating, for example at every $t_n$ instant, determining the difference in the average of the vectors $\hat{\theta}^*(t_n) = [\theta^*(t_0), \ldots, \theta^*(t_n)]$ and $\hat{\delta}(t_n) = [\delta(t_0), \ldots, \delta(t_n)]$ so as to obtain the average offset($t_n$) difference. In fact, the offset($t_n$) value then corresponds to the minimum of the cost function $\hat{\theta}^*(t_n) - \hat{\delta}(t_n) - \text{offset} * 1_n$, $1_n$ being the identity matrix of the dimension n.

Thus, the method proposes to use all the $\theta^*(t_i)$ and $\delta(t_i)$ values in a statistical fashion so as to continuously improve the accuracy of the average offset($t_n$) since the number of values used increases over time. Moreover, it may be supposed that all the disruptions that affect the calculation of the estimates $\theta^*(t_i)$, for example, such as the uneven ground, are centred on zero, the proposed statistical calculation making it possible to rapidly converge towards the sought offset value.

Consequently, by adding the average offset$(t_n)$ difference and the angular position $\delta(t_n)$, the processing device 8 can deliver the absolute angular position $\theta^*(t_n)$ repeatedly, overcoming most of the faults in the driving area.

According to an embodiment of the invention, the accuracy in the determination of the absolute angular position can be improved by planning to implement this process under specific driving conditions. For example, as mentioned above, the driving conditions can include a maximum rotation speed of the steering wheel so as to restrict the disruptions linked to the delay in the vehicle coming in line with the trajectory and/or a minimum speed of the vehicle in order to enable an improvement of the accuracy of the estimates. As a numerical example, the speed limit of the vehicle may be set at 5 km/h and the speed limit of the steering wheel at 20°/s. Thus, if these conditions are met for at least 2 seconds, not necessarily consecutively, it is possible to obtain the absolute angular position with a typical precision of around +/−5°. This precision can therefore be obtained after driving for 25 m and can be established to within +/−2° after driving for 50 m.

Furthermore, the determination system makes it possible to overcome the mechanical indexing faults between the encoder 5 and the steering wheel 1, since these are corrected when calculating the offset value.

What is claimed is:

1. A method for determining the absolute angular position $\theta$ of the steering wheel of a motor vehicle with respect to the chassis of said vehicle,
said method comprising using a system including:
  a device for incremental measurement of the relative angular position $\delta$ of the steering wheel, including:
    an encoder positioned to rotate together with the steering wheel, said encoder including a main multipolar track;
    a fixed sensor arranged with respect to and at a gap distance from the encoder, including at least two sensitive elements positioned with respect to the main track so as to deliver two periodic electrical signals S1, S2, in quadrature, the sensor including a suitable electronic circuit, so as to deliver the relative angular position $\delta$ of the steering wheel based on the signals S1, S2;
  a device for measuring differential speed $\Delta V/V$ of vehicle wheels on a same axle;
  a processing device sampling, in a period t, the angular positions $\delta(t_i)$ and the differential speeds $\Delta V/V(t_i)$, said device including calculation means for determining, at every $t_n$ instant, an estimate $\theta^*(t_n)$ of the absolute angular position $\theta(t_n)$ according to the differential speed $\Delta V/V(t_n)$, the average offset$(t_n)$ difference between the angular positions $\theta^*(t_i)$ and $\delta(t_i)$, where i varies from 0 to n; and the absolute angular position $\theta(t_n)$;
said method further including the following repeated steps:
  measuring the angular position $\delta(t_i)$ and the differential speed $\Delta V/V(t_i)$;
  determining an estimate $\theta^*(t_n)$ of the absolute angular position $\theta(t_n)$ according to the differential speed $\Delta V/V(t_n)$;
  determining the difference in the average of the vectors $\hat{\theta}^*(t_n)=[\theta^*(t_0),\ldots,\theta^*(t_n)]$ and $\hat{\delta}^*(t_n)=[(t_0),\ldots,\delta(t_n)]$ so as to obtain the average offset$(t_n)$ difference;
  determining the absolute angular position $\theta(t_n)$ by adding the average offset$(t_n)$ difference and the angular position $\delta(t_n)$.

2. A method according to claim 1, wherein the measurement of the differential speed $\Delta V/V(t_i)$ is taken on non-drive wheels of the vehicle.

3. A method according to claim 2, implemented under predetermined driving conditions, wherein the predetermined driving conditions include at least one of a maximum rotation speed of the steering wheel and a minimum speed of the vehicle.

4. A method according to claim 1, implemented under predetermined driving conditions, wherein the predetermined driving conditions include at least one of a maximum rotation speed of the steering wheel and a minimum speed of the vehicle.

* * * * *